Figure 1:
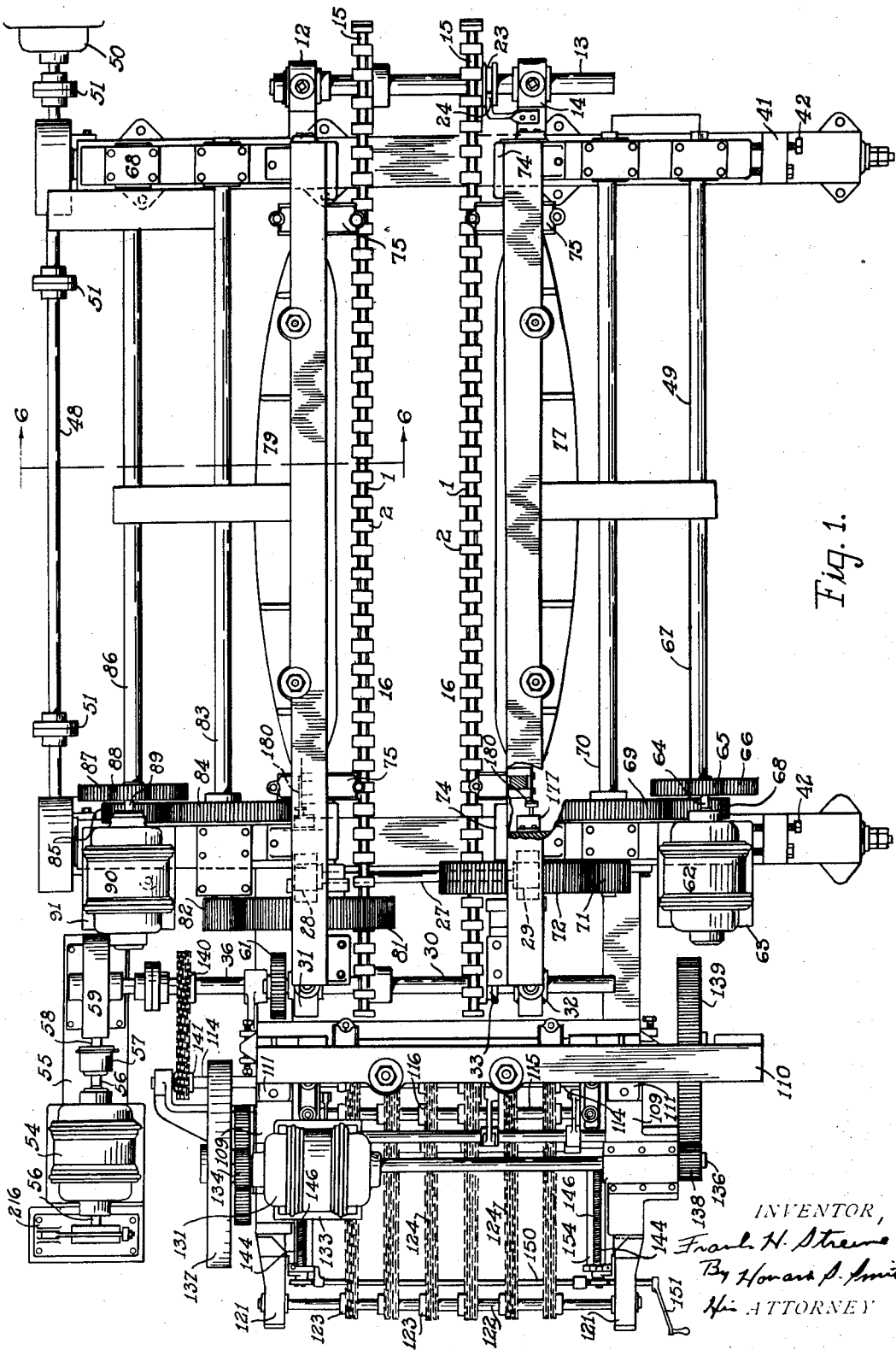

June 30, 1931.  F. H. STREINE  1,812,122
CONTINUOUS AUTOMATIC SHEARING MACHINE
Filed Sept. 7, 1928   6 Sheets-Sheet 2

INVENTOR,
Frank H. Streine,
BY Howard D. Smith,
ATTORNEY

June 30, 1931. F. H. STREINE 1,812,122
CONTINUOUS AUTOMATIC SHEARING MACHINE
Filed Sept. 7, 1928  6 Sheets-Sheet 4
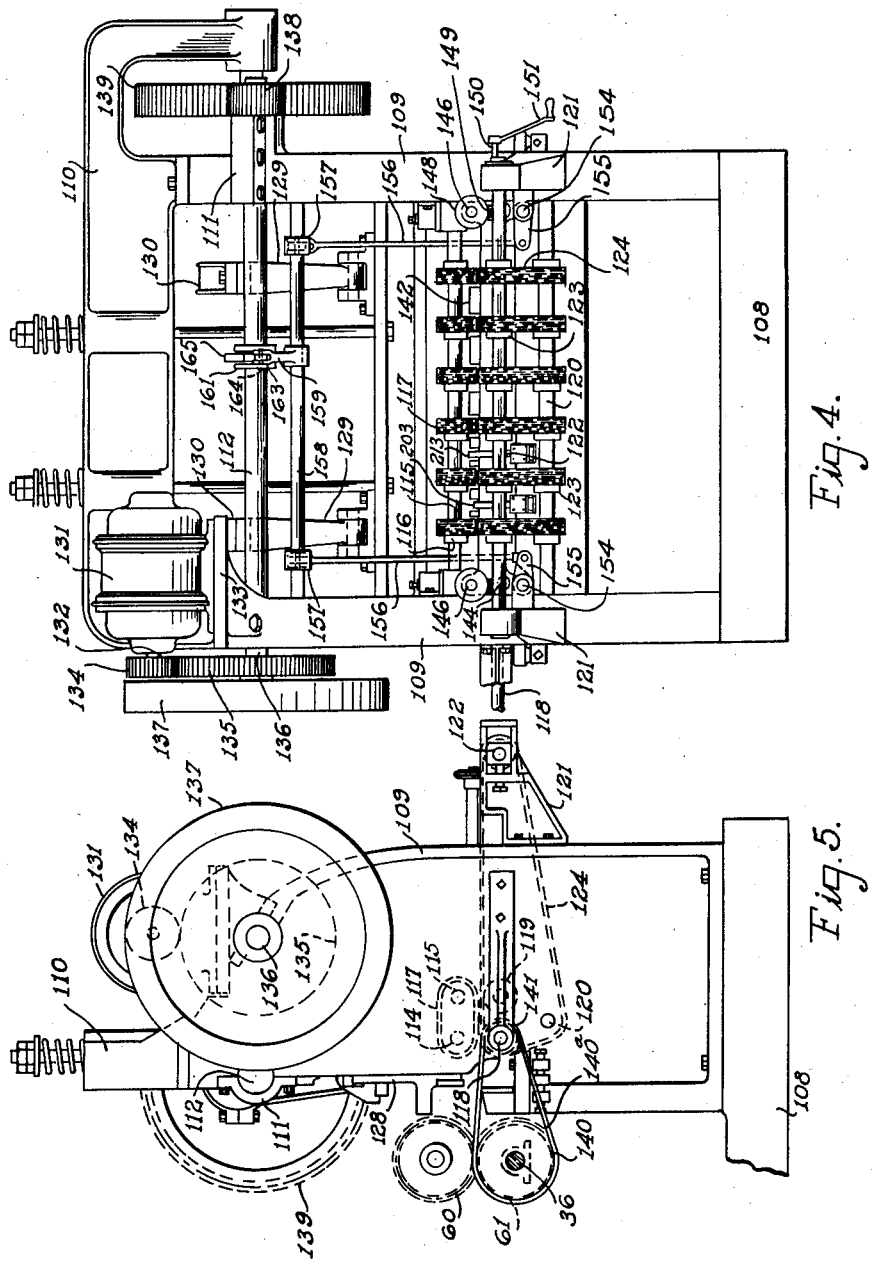

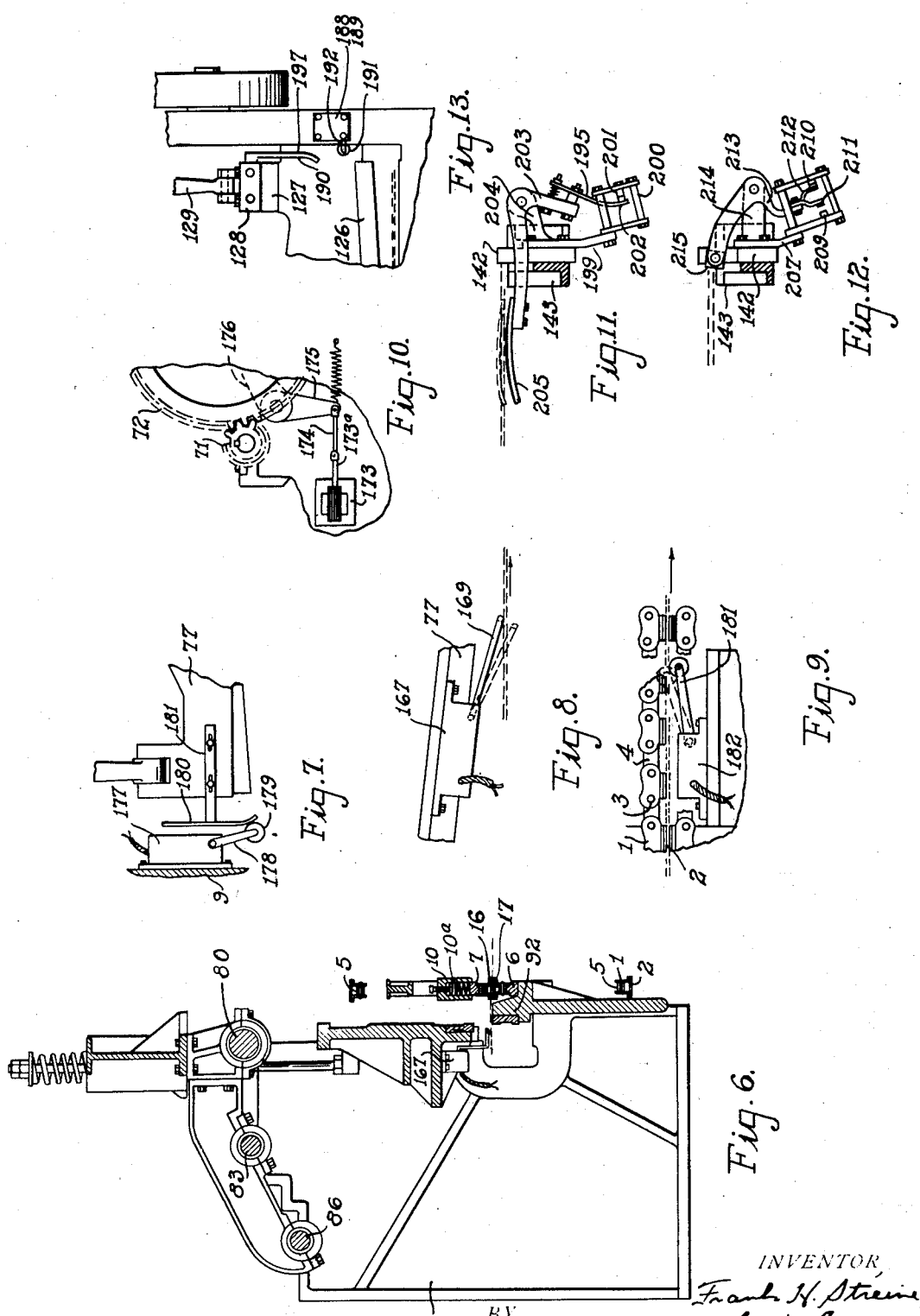

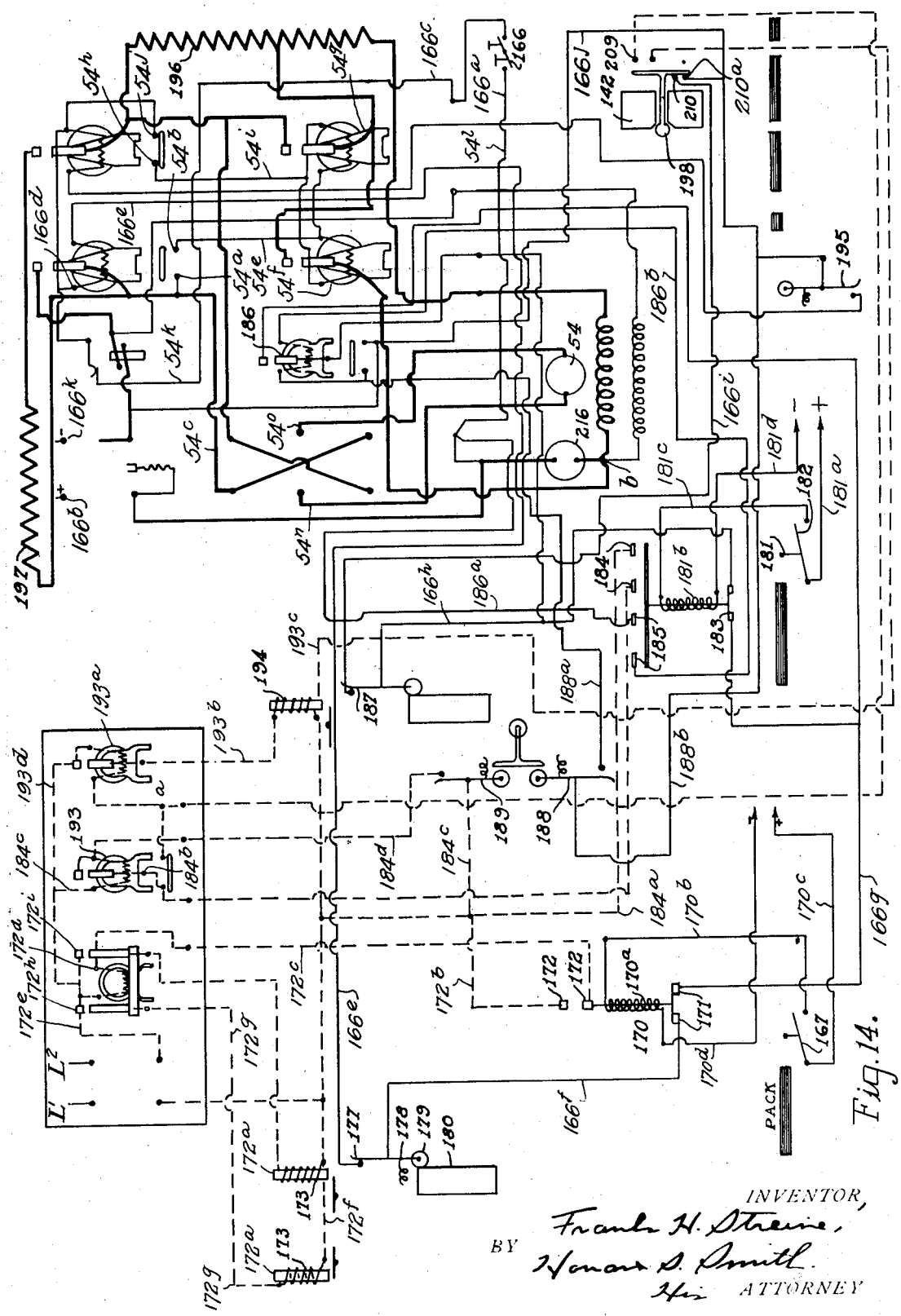

Patented June 30, 1931

1,812,122

UNITED STATES PATENT OFFICE

FRANK H. STREINE, OF NEW BREMEN, OHIO, ASSIGNOR TO THE STREINE TOOL AND MANUFACTURING COMPANY, OF NEW BREMEN, OHIO, A CORPORATION OF OHIO

CONTINUOUS AUTOMATIC SHEARING MACHINE

Application filed September 7, 1928. Serial No. 304,526.

This invention relates to new and useful improvements in continuous, automatic shearing machines.

It is the principal object of the invention to substantially reduce the labor cost and materially increase production in sheet and tin plate mills by the provision of a continuous, automatic shearing machine. Since it requires only two operators, this machine is capable of handling seven or eight packs a minute in a tin plate mill.

It is another object of the invention to provide endless hold-down means such as caterpillar conveyors for flattening out the sheets before they are presented to the side cutting shears, since the tin plate packs are not flat but bowed. If they were not flattened out prior to the side shearing operation, these sheets would have a tendency to skid or camber and their side edges would not be straight. But when the sheets are maintained in correct alinement with the shearing devices at all times by the caterpillar hold-down conveyors, they will be sheared absolutely true by the cutting blades irrespective of the type of blades employed.

It is another object of the invention to provide indicator and adjusting means for positioning one side shear, which is laterally movable, at such a distance from the stationary shear that the pack will be trimmed by both shears to the desired width. These means enable the operator to adjust the side shears to within less than 1/64th of an inch.

It is another object of the invention to provide electrical means that are automatically operated to stop the conveyors and to trip the side shears so that the latter will trim the side edges of the sheets while they are held flat by the caterpillar conveyors.

It is another object of the invention to provide an end cutting shear which receives the side trimmed sheets to cut off the curl or front ends of them. The sheets are automatically stopped for this operation by an electric switch located on the shear bed, this switch controlling an adjustable time relay to gauge the amount of curl which it is necessary to trim off.

The invention is designed to shear both sheet packs and tin plate packs. The rough edges are not only taken off of the tin plate packs by the shearing machine, but it is designed to cut them into multiples. For this purpose the end cutting shear is provided with a gauge which is adjustable for lengths of from twelve inches to thirty inches, or for any other lengths desired.

It is another object of the invention to provide an electric switch which automatically stops the conveyor at the point where it is desired to cut off the sized multiples required. This operation is repeated until the entire pack has passed through the end shear.

While this pack is in the process of being cut into the desired sizes, another pack is presented to the side cutting shears, thus making for continuous, automatic shearing.

The continuous, automatic shears can be arranged for three purposes: for cutting packs of tin plate into multiples; for cutting packs of sheets and for cutting flat sheets and plates of ferrous or non-ferrous metal.

The invention may be embodied in machines that vary in form and in structure, and are designed and constructed for use in continuously and automatically shearing sheets of different sizes of metal and of varied thickness, or packs of varied thickness. While the principal objects of this invention are stated above, others will appear in the following specification describing the embodiment of the invention set forth in the accompanying drawings.

Figure 2:
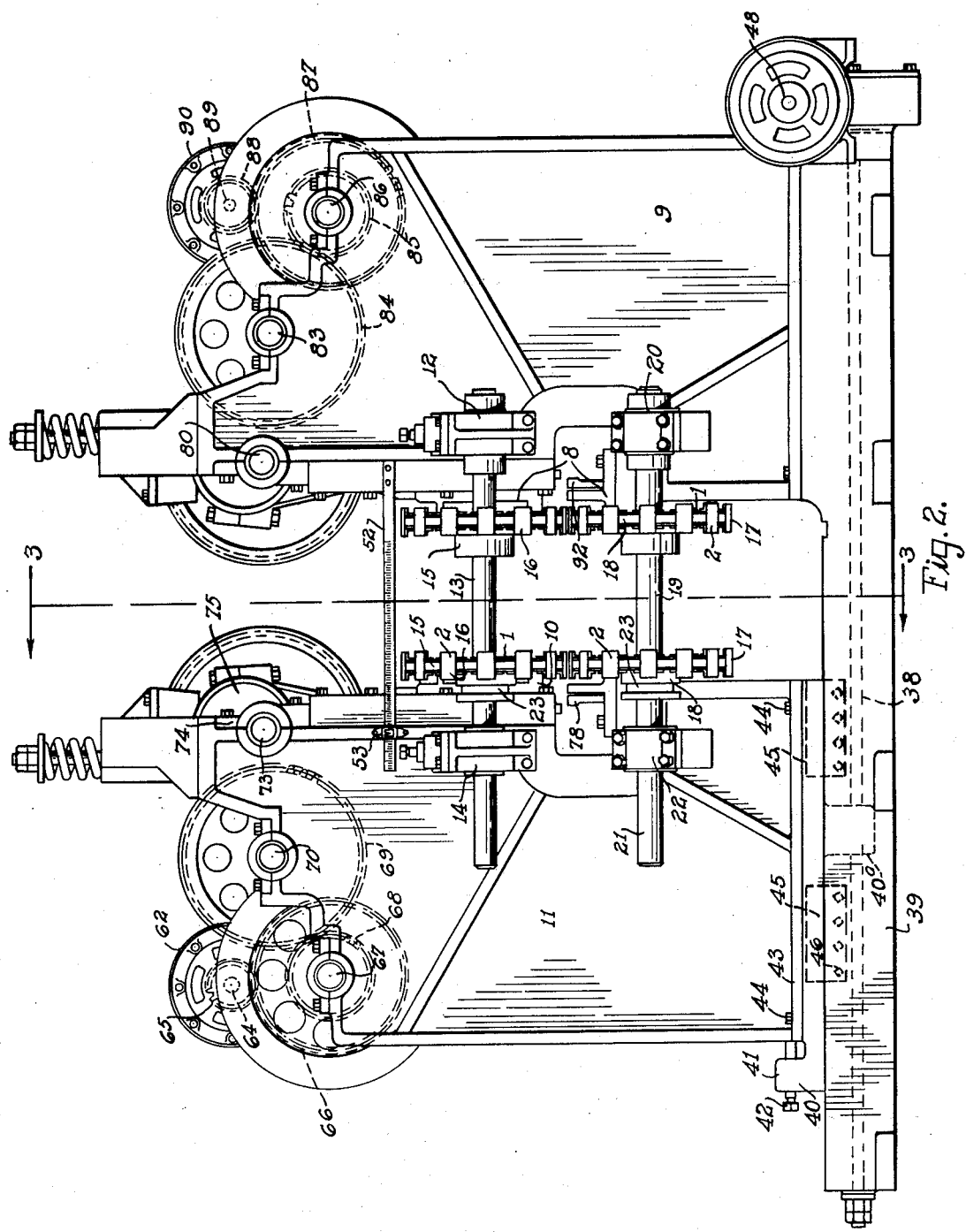
Figure 3:
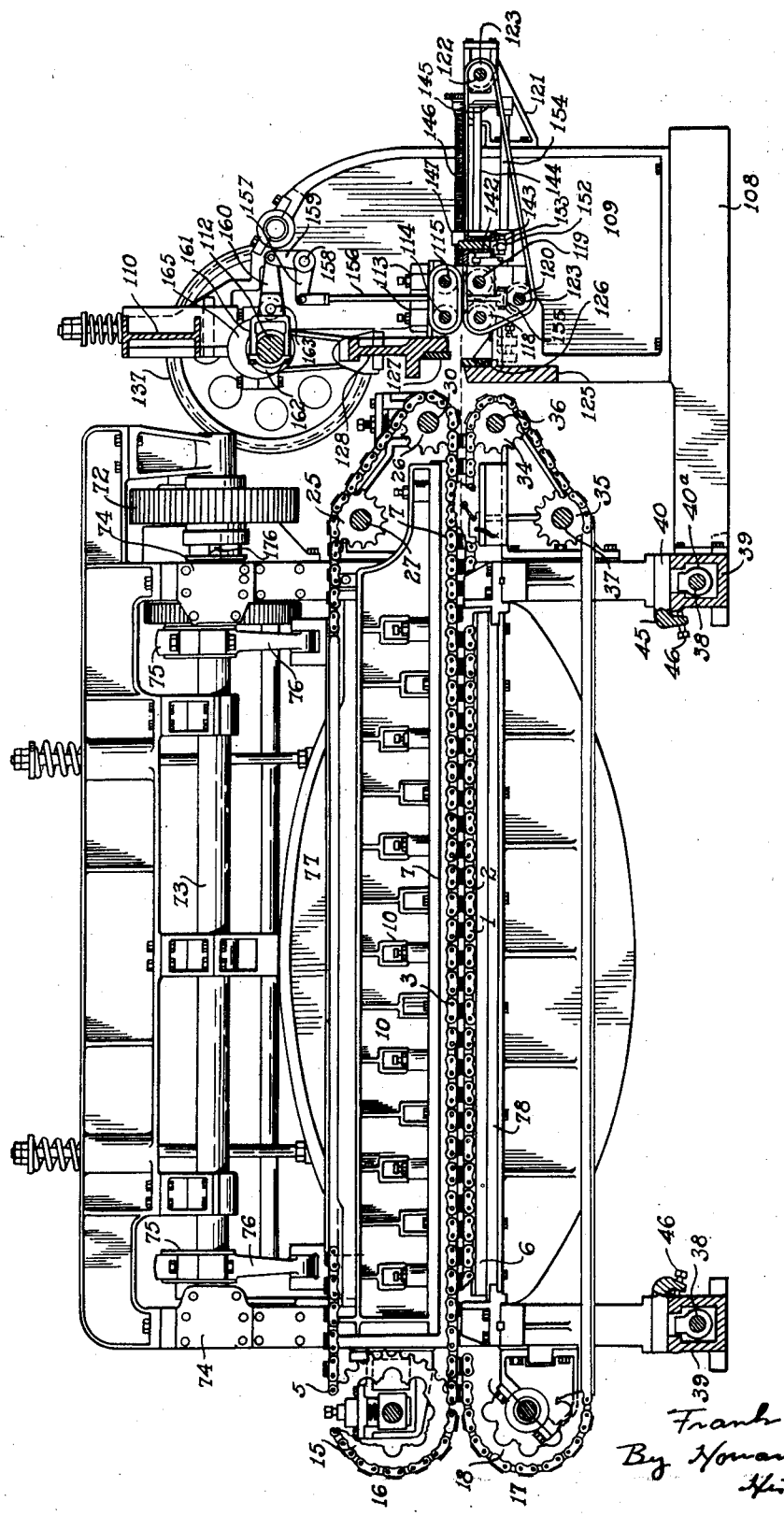

In the accompanying drawings, Figure 1 is a top plan view of the complete continuous, automatic shearing machine, broken away to disclose one of the safety switches. Figure 2 is a view of the receiving end of the machine. Figure 3 is a longitudinal section taken through the machine on the line 3—3 of Figure 2, showing the caterpillar chains, the end shear and some of the control switches. Figure 4 is a rear view of the end shear. Figure 5 is a side view thereof. Figure 6 is a sectional view taken through one of the side shears on the line 6—6 of Figure 1, showing the caterpillar conveyor cutout switch. Figure 7 is a detail view of one of the shear safety switches. Figure 8 is a detail view of the caterpillar chain cutout switch. Figure 9 is a detail view of the conveyor and shear control switch. Figure 10 is a detail view of one of the solenoids for operating the various shear clutches. Figure 11 is a detail view of the slow down limit switch for the end shear. Figure 12 is a detail view of the stop limit switch for the same shear. Figure 13 is a detail view of the by-pass limit switch. And Figure 14 is a schematic electrical diagram, in which view alternating current circuits are shown by dotted lines and direct current circuits by full lines.

In the description, and also in the claims, I shall allude to the packs of sheets and plates broadly as sheets or metal sheets until I otherwise distinguish one from the other.

In the form of construction illustrated in the drawings, the sheets are fed from a suitable table, not shown, to the endless conveyors such as those of the caterpillar type now to be described. There are four of these conveyor chains illustrated. They are disposed in pairs, one above the other, and extend from the front part of the machine to points immediately in front of an end shear to present the metal sheets in a flattened state to the side shearing devices as well as to the end shear. Each caterpillar chain comprises a series of links 1, to which metal pads 2 are secured in such a manner that the pads on the lower chain will co-act with the pads on the upper chain to exert sufficient pressure upon the metal sheets introduced between them that the sheets will be flattened out and held firmly against skidding or swerving to the right or to the left.

The links 1 are pivotally connected by pins 3 to intermediate links 4. Mounted upon the pins 3 are rollers 5. The rollers on the lower chain travel upon rails 6, while the rollers of the upper chain travel along rails 7. These rails, which are provided for the purpose of holding the co-acting pads 2 in a uniformly spaced relation, are shown as four in number in the accompanying drawings.

The rails 6 and 7 on the right side of the machine are held in their desired spaced relation by bracket members 8 which are secured to the fixed shear housing 9, while the co-acting rails 6 and 7 on the left side of the machine are secured in the same spaced relation by bracket members 10 carried by the movable shear housing 11. The upper bracket members 10 are each shaped like an inverted U in cross section, as shown in Figure 6, to receive a spring 10$^a$ for the purpose of placing the proper tension on the two top rails 7 which are free to float in said bracket members. This top rail and spring structure imparts to the conveyors their hold-down qualities.

Journaled in a bearing 12 secured to the front end of the fixed shear housing 9 is one end of a shaft 13. The other end of this shaft is slidably mounted in a bearing 14 secured to the front end of the adjustable shear housing 11. Mounted on the shaft 13 are two sprocket wheels 15, 15 which receive the top caterpillar conveyor chains 16, 16. The lower caterpillar conveyor chains 17, 17 at the receiving end of the machine travel over sprocket wheels 18, 18 that are mounted on a sprocket shaft 19. One end of this shaft is journaled in a bearing 20 secured to the fixed shear housing 9, while its other end 21 is slidably mounted in a bearing 22 secured to the front end of the adjustable shear housing 11.

In order to vary the horizontal distance between the caterpillar chains to accommodate sheets of different widths, the sprocket wheels 15 and 18 on the left side of the machine are free to be moved along the shafts 13 and 19 with the adjustable shear housing 11. The latter housing and these sprocket wheels are connected in the following way for this purpose. Formed in the hub of each one of the last named sprocket wheels is an annular groove 23 which receives a forked rod 24 attached to the housing 11. Therefore, when the housing 11 is moved laterally, it will cause the sprocket wheels 15 and 18 on its side of the machine to be shifted with it along the shafts 13 and 19. (See Figures 2 and 3.)

At the delivery end of the machine the upper caterpillar conveyor chains 16, 16 pass around sprocket wheels 25, 25 and sprocket wheels 26, 26 below and to the rear of them. The sprocket wheels 25, 25 are mounted on a shaft 27 journaled in a bearing 28 secured to the fixed shear housing 9 and slidable in a bearing 29 secured to the movable shear housing 11. The sprocket wheels 26, 26 are keyed to a shaft 30 journaled in a bearing 31 secured to the fixed housing 9 and slidable in a bearing 32 secured to the movable shear housing 11.

The sprockets 25 and 26 belonging to the movable shear housing 11 have their hubs formed with grooves 33 so that they may be shifted with it along their respective shafts by forked rods similar to the rods 24, attached to said housing.

The lower caterpillar chains 17 at the delivery end of the machine pass around sprockets 34, 34 and 35, 35. The sprockets 34, 34, which are directly below the sprockets 26, 26 are mounted on a shaft 36 journaled in bearings supported by the fixed housing 9 and the movable housing 11 in a similar manner to the shaft 30. The sprockets 35, 35 are mounted on a shaft 37 in front of the shaft 36 directly below the shaft 27; and like the latter, are supported by the fixed housing 9 and the movable housing 11.

The sprockets 34 and 35 belonging to the movable shear housing 11, are adjustable on the shafts 36 and 37 like the sprockets 26 and 25 above them are upon their shafts, in order to preserve the proper horizontal distance between the conveyor chains of the machine.

On opposite sides of the caterpillar conveyor chains 16 and 17 are located, face to face, gate shearing devices of a type well known in the art. Preferably, the shears of the shearing devices are so located that they will cut from the leading end and at the same rate beginning at the same instant to prevent creeping or twisting of the metal.

The shear housing 11 may be moved toward or away from the shear housing 9 for the purpose of adjusting said devices with respect to each other to properly trim the metal sheet presented to their shearing blades. The adjusting means which are employed for the shearing device 11, comprise screws 38 that will draw it over the base rails 39.

The shear housing 11 is carried by adjustable shoes 40 that travel upon the base rails 39. Each shoe has an upturned end 41 formed with holes through which adjusting screws 42 engage the outer ends of the housing sides. These sides are formed with base flanges 43 having slots to receive vertical adjusting screws 44 for engagement with the shoes to hold them in an adjusted position with respect to said housing. (See Figures 1 and 2.)

The shoes 40 are properly guided in their travel over the base rails 39 by flange projections 45 carrying adjusting screws 46.

The base rails 39, 39 are formed with grooves as shown in Figure 3 to permit the travel therein of projections 40ª on the shoes 40. Through threaded holes in these projections the screws 38 pass for the purpose of shifting the shear housing 11 upon the rails when the screws are rotated by means now to be described. These screws 38 project beyond the base rails on the fixed shear side of the device for a spiral gear connection (not shown) with a sectional main shaft 48. This shaft, which is journaled in suitable bearings (not shown) secured to the base rails 39, is driven by a reversible electric motor 50. (See Figure 1.) In order to compensate for any misalinement of the shaft 48, its sections are connected by flexible couplings 51.

From the foregoing description it will be seen that the reversible motor 50 may be operated to adjust the shear housing 11 with respect to the fixed shear housing 9 to vary the horizontal distance between the caterpillar chains to accommodate sheets of different widths. When this adjustment has been made, the movable shearing device 11 may be firmly held in its adjusted position through the engagement of the screws 46 with the sides of the base rails 39. (See Figures 1 and 3.)

The proper adjustment of the shearing device 11 with regard to the fixed shearing device 9 is indicated to the operator by the following means. Secured to the fixed shear housing 9 is one end of a scale 52. The other end of this scale projects through an indicating member 53 secured to the movable shear housing 11. The registry of a predetermined graduation on the scale 52 with the fixed indicating member 53, will reveal to the operator that the shearing device 11 has been shifted to the proper position to conform the shearing blades to the width of the sheet to be trimmed. (See Figure 2.)

The caterpillar conveyor chains are driven by an electric motor 54 through the agency of the following power transmission mechanism. The motor 54, which is mounted on a sub base 55, has an armature shaft 56. (See Figure 1.) By a flexible coupling 57 this shaft is connected to a stub shaft 58.

For the purpose of driving it, the shaft 58 is connected to a sprocket shaft 36 through a reduction gearing (not shown) in a casing 59 mounted on the sub base 55. The sprocket wheels 34, being mounted for rotation by the shaft 36, will drive the lower caterpillar chains 17. The upper caterpillar chains 16 will be driven by sprockets 26, 26 that are mounted on the shaft 30, which is rotated by the shaft 36 through the engagement of a gear 60 on the latter with a gear 61 on the shaft 30. (See Figures 1 and 5.)

The electric switch mechanism for controlling the motor 54 to start and stop the movement of the caterpillar chains will be hereinafter described.

The shearing devices 9 and 11 are operated by the following means. Referring to Figure 1, an electric driving motor 62 is mounted on a motor plate 63 secured to the movable shear housing 11. This motor 62 has an armature shaft 64 to which there is secured a pinion 65. The latter meshes with a gear 66 fast on a shaft 67 journaled in bearings in the movable housing 11.

Also fast on the shaft 67 is a gear 68 which is engaged with a gear 69 mounted on a shaft 70 journaled in bearings secured to the movable housing 11. Fast on the outer end of the shaft 70 is a pinion 71 that meshes with a gear 72 which, through an electrically operated clutch hereinafter referred to, drives eccentric shaft 73 journaled in bearings 74 secured to said housing. Mounted on the eccentric shaft 73 are eccentrics 75 which, through followers 76, are connected in a well known manner to a counter-balanced gate shear 77 which works in conjunction with a fixed blade 78 supported by the movable shear housing 11. (See Figures 1 and 3.)

The gate shear 79 in the fixed housing 9 is operated in the same manner by an eccentric shaft 80 journaled in bearings in said housing. Mounted on the eccentric shaft 80 is a gear 81 which, through the medium of an electrically operated clutch to be hereinafter referred to, controls the shear 79. The gear 81 meshes with a pinion 82 secured to an intermediate shaft 83 journaled in bearings in said housing 9. Fast on the intermediate shaft 83 is a gear 84 which meshes with a pinion 85 secured to a shaft 86 also journaled in bearings in the fixed shear housing. Secured to the shaft 86 is a gear 87 which meshes with a pinion 88 attached to the armature shaft 89 of an electric motor 90 mounted on a motor plate 91 secured to the fixed shear housing 9. (See Figures 1 and 2.)

After the sheets have been conveyed into the machine by the caterpillar chains, and the latter are stopped, the sheets will be firmly held in their flattened state by these chains against wobbling or turning during the cutting operation.

A description of the electrical means for operating the caterpillar chains and the side shearing devices will be postponed to a description of the end shear, since the means for operating it are intimately related to those for operating the endless conveyors and the side shears.

The caterpillar chains 16 and 17 convey the side trimmed sheets to this end shear for the purpose of cutting off their front ends and thereafter cutting them into multiples. Referring to Figures 3, 4 and 5, the numeral 108 designates the end shear base which is bolted at its front end to the rear base rail 39 for the side shearing devices. Bolted to the base 108 are two standards 109, 109 which support at their upper ends a cross head 110. Journaled in bearings 111, 111 bolted to the standards 109, 109 respectively, is an eccentric shaft 112 for operating the movable end shear blade and the stop bar to be hereinafter described.

The endless belt conveyors which receive the side trimmed sheets from the side shears will first be described. Journaled in adjustable bearings 113 secured to the standards 109, 109 are two transverse shafts 114 and 115. Secured to the shafts 114 and 115 is a series of sprockets 116 over which pass endless conveyors such as the link belts 117. (See Figures 1, 3, 4 and 5.)

Directly below the two shafts 114 and 115 are two similar shafts 118 and 119 journaled in bearings secured to the standards 109, 109. Midway between and a short distance below the shafts 118 and 119 is a shaft 120 journaled in bearings secured to said standards. Journaled in bearings carried by brackets 121, 121 secured to and projecting rearwardly from the standards 109, 109 is a shaft 122 similar to the shafts 118, 119 and 120. (See Figures 1, 3, 4 and 5.)

Secured to the shafts 118, 119, 120 and 122 are alined sprockets 123 around which pass endless conveyors such as the link belts 124 which co-act with the belts 117 to receive the side trimmed sheets from the side shears and convey them through the end shear.

For the purpose of cutting off the curl or front ends of the side trimmed sheets and for thereafter cutting them into multiples, there is secured to a cutter bar 125 attached to the standards 109, 109, an adjustable lower shear blade 126. (See Figures 3 and 5.) Adapted to co-act with this blade 126 is a blade 127 secured to a vertically movable cutter bar 128 above the cutter bar 125. To the cutter bar 128 there are pivotally secured follower arms 129 which are operated by eccentrics 130 on the shaft 112. (See Figures 1, 3, 4 and 5.)

The eccentric shaft 112 is driven by an electric motor 131 through the following means, to reciprocate the end shear blade 127. Connected to the armature shaft 132 of the motor 131, which is supported on a motor plate 133 attached to the right standard 109, is a pinion 134. This pinion meshes with a gear 135 fast on a shaft 136 journaled in bearings secured to both standards 109, 109. On the same end of this shaft 136 as the gear 135, there is mounted a fly wheel 137. On the other end of the shaft 136 there is mounted a pinion 138 which meshes with a gear 139 on the eccentric shaft 112.

For the purpose of rotating the endless link belts 117 and 124, there is mounted on the shaft 36 a sprocket 140 around which passes an endless chain 140ª that also travels over a sprocket 141 fast on the shaft 118. (See Figure 5.) A gear connection is the conventional drive between the shafts 118 and the shaft 114 to rotate the endless link belts 117, or any other form of endless conveyors employed.

The co-acting endless link belts 117 and 124 are adapted to bring the side trimmed sheet to the following adjustable stop means to permit the end shear blades 126 and 127 to cut from the sheet a multiple of the desired dimensions.

The end shear conveyors 117 and 124 at all times coact to hold the side trimmed sheet in a correct position for shearing by the end shear; in other words, it will so hold the sheet that the end cuts will be in correct relation to the side cuts.

Referring to Figure 3, the numeral 142 designates a stop bar which is vertically movable in a slot in a reinforced cross slide 143 which is free to travel back and forth on rods 144 secured to brackets 145 attached to the standards 109, 109. The cross slide 143 is formed with holes through which these rods pass, and along which the slide is adjustable by means of screws 146, 146. (See Figures 3 and 4.) The screws 146, 146 pass through threaded ears 147, 147 on the cross slide 143, and on the rear ends of these screws are worm gears 148, 148 that mesh with worms 149, 149 on a shaft 150. This shaft is journaled in bearings secured to the standards 109, 109 and has attached to one end a crank 151 by which it is rotated to turn the screws 146, 146 to bring the cross slide 143 to a position where the stop bar 142 may be elevated by means soon to be described into the path of a rearwardly traveling sheet or sheets.

There project downwardly from the stop bar 142, arms 152 which are pivotally connected at their lower ends to rocker arms 153, 153. These rocker arms 153 are keyed to shafts 154, 154 journaled in brackets which make them parallel with the rods 144, 144. Along these shafts 154 the rocker arms 153 are free to be drawn by the cross slide 143.

The shafts 154, 154 are rocked by the eccentric shaft 112 through the following means so that when the conveyors start, the stop bar 142 will also start to rise, not only to stop the next sheet but to elevate the one already cut by the end shear so that it will fall upon the sheet previously cut by said shear.

To each shaft 154, near its outer end, there is connected a rocker arm 155 which is pivotally connected at its outer end to a vertical rod 156. At its upper end this rod is pivotally connected to one end of an arm 157 fast on a shaft 158 journaled in bearings secured to the standards 109, 109. (See Figure 4.)

Also secured to the shaft 158 is an arm 159 pivotally secured at its upper end to a thrust member 160. The latter terminates at its inner end in a yoke 161 which straddles the eccentric shaft 112 to act as a guide for the reciprocal movement of the thrust member. To the front end of the yoke there is secured a curved cap piece 162 to limit the outward movement of the thrust member. (See Figures 3 and 4.)

The thrust member 160 is formed at the inner end of its yoke portion with a groove to receive a roller 163 mounted on a pin 164 secured within said groove. This roller is adapted to be engaged by an eccentric cam 165 fast on the shaft 112, so that when the latter is rotated, the thrust member 160 will be forced outwardly by the cam to elevate the stop bar 142 through the mechanism just described.

The electrically actuated clutches which connect the shears 77, 79 and 127 to their various sources of power are one revolution clutches.

The operation of the complete machine will now be described in connection with the schematic electrical diagram shown in Figure 14. The sheet and tin plate packs are fed from a table, not shown, to the caterpillar chains 16 and 17 at the receiving end of the machine. These chains 16 and 17 flatten out the bowed packs and convey them in a rigid manner to the side shear blades.

The diagram in Figure 14 shows the position of all switches, with the caterpillar conveyor chains stopped and the pack ready to start through. To start the conveyor motor 54, a push button 166, located at any convenient place, is depressed, whereupon the pack is conveyed by the caterpillar chains in a flattened and rigid manner to a proper position for shearing.

Mounted on the movable cutter bar 77 near its inner end is a lever 167 in the path of inward movement of one side edge of the pack below it as shown in dotted lines in Figure 8.

When this side edge of the pack engages the lever 167, it will close a circuit now to be described to energize a solenoid limit switch 170. This circuit is defined by coil $170^a$ which is connected to the switch 167 by a wire $170^b$. The switch 167 is connected by a wire $170^c$ to the positive side of the line. The other side of the coil $170^a$ is connected by wire $170^d$ to the negative side of the line. The contacts 171 of the switch 170 will then be separated by the solenoid $170^a$ of switch 170 to open the push button circuit which controls the motor 54, to stop the conveyor chains. The push button circuit is defined by a wire $166^a$ that leads from the push button 166 to the positive side $166^b$ of the D. C. line. A line $166^c$ leads from the push button 166 to the coil $166^d$. The coil $166^d$ is connected by a wire $166^e$ to a safety switch 177. A wire $166^f$ runs from the safety switch 177 to the contacts 171, 171. From the latter a wire $166^g$ leads to the contactor 186. A wire $166^h$ runs from the contactor 186 to the safety switch 187. The latter is connected by a wire $166^i$ to a contact 210. From a companion contact $210^a$ a wire $166^j$ runs to the negative side $166^k$ of the D. C. line, thus completing the push button circuit.

The motor circuit is defined as follows. The numerals $54^a$ and $54^b$ designate in Figure 14 two contacts. The contact $54^a$ is connected by a wire $54^c$ with the negative side $166^k$ of the D. C. line. The contact $54^b$ is connected by a wire $54^e$ to a coil $54^f$ and a coil $54^g$. The other side of the coils $54^f$ and $54^g$ are connected to a contact $54^h$ by a wire $54^i$. A companion contact $54^j$ is connected by a wire $54^k$ to the push button switch 166 which is connected by a wire $54^l$ to the positive side $166^b$ of the D. C. line. This completes the circuit which closes the contactors $54^f$ and $54^g$ to start the motor 54, which is itself included in the following circuit.

The armature of the motor 54 is connected by a wire $54^n$, through the motor reversing switch, to the positive side $166^b$ of the D. C. line; and by a wire $54^o$, through the motor reversing switch, to the negative side $166^k$ of the D. C. line.

When the side edge of the pack below it engages the lever 167, the latter will close a D. C. circuit to energize a solenoid limit switch 170. The D. C. single pole contactor of the switch 170 will then be separated by the solenoid 170ᵃ of this switch to open the D. C. contactors 54ᶠ and 54ᵍ which will open the motor circuit. At the same time the solenoid 216 will be de-energized through the same contactors 54ᶠ and 54ᵍ to act as a dynamic brake to completely stop the motor 54 and thereby bring the conveyor chains to a full stop.

When the solenoid 170ᵃ of the switch 170 is operated to open the contacts 171, 171, it will effect an engagement between the contacts 172, 172 to close the following electric circuit which energizes solenoids 172ᵃ, 172ᵃ that actuate latch trips 173, 173 respectively. The two A. C. lines are designated by the characters L¹ and L². One contact 172 is connected by a wire 172ᵇ to the A. C. line L¹. (The dotted lines define the A. C. circuits.) The other contact 172 is connected by a wire 172ᶜ to the coil 172ᵈ. The other side of the coil 172ᵈ is hooked to the A. C. line L² by a wire 172ᵉ. The two solenoids 172ᵃ, 172ᵃ are hooked directly to the A. C. line L¹ by a wire 172ᶠ. The other side of the solenoids are connected to the A. C. line L² by a wire 172ᵍ through the two contacts 172ʰ and 172ⁱ. One latch trip 173 is for the release of the cutter bar 77 and the other latch trip is for the release of the cutter bar 79 through the medium of a conventional shear clutch (not shown). This clutch is operated by the latch trip mechanism through a link 174 secured at one end to a solenoid plunger 173ᵃ and at its other end to an arm 175 which is pivoted to the cutter bar.

Referring to Figure 10, when the solenoid of the latch trip mechanism 173 is energized, the arm 175 will be drawn into the path of movement of the rotating dog 176 of the shear clutch to cause the continuously rotating gear 72 to turn the eccentric shaft 73 to depress the movable blade to trim the rough edges from the sheet.

The latch trip mechanism 173 for the gear 80 will cause the cutter bar 79 to descend in the same manner to trim the rough edges from the other side of the pack.

The side shear safety switches will now be described. Referring to Figures 1, 7 and 14, there is secured to each shear housing a safety switch 177 operated by a switch lever arm 178 carrying on its free end a roller 179. The latter is positioned to be engaged by a cam member 180 attached to a flat supporting piece 181 adjustably secured to a respective cutter bar—in Figure 7 the cutter bar 77. When the blade descends, the cam member 180 will engage the roller 179 to open the D. C. switch 177. This switch 177 being in circuit with the caterpillar chain motor circuit, will open the latter to prevent the movement of the caterpillar chains through the accidental closing of the caterpillar conveyor motor circuit in any way while the side shears are in operation.

After the rough side edges have been trimmed from the pack in the manner just described, the lever 167 which has been held up by one of these edges will now descend to cause a re-engagement of the contacts 171, 171 of the limit switch 170 to close the conveyor circuit. However, the caterpillar chains 16 and 17 will not be operated to convey the pack to the end shear until the safety switches 177 have again been closed. These will be closed to complete the circuit through the conveyor motor 54 only when the side shears are returned to their uppermost positions. When they reach these positions, the cam member 180 will have cleared the rollers 179, whereupon the switches 177 will be automatically closed and the circuit will be completed through the motor 54 to again start the conveyor chains.

The pack is then moved toward the end shear by the caterpillar chains 16 and 17. At a predetermined point in its travel toward this shear, the pack will hit the lever 181 of a switch 182 which closes a circuit that operates a D. C. solenoid 181ᵇ of a D. C. operated time relay switch. (See Figures 9 and 14.) One side of the switch 181 is connected to the positive side 166ᵇ of the D. C. line by a wire 181ᵃ. The other side of the switch 181 is connected to one side of the time relay coil 181ᵇ of the time relay switch by a wire 181ᶜ. The other side of the coil 181ᵇ is connected to the negative side 166ᵏ of the D. C. line by a wire 181ᵈ. By adjusting this switch it is possible to stop the pack at any desired position in respect to the knives of the end cut shear.

The contacts 184 of the time limit relay switch then release the end shear blade through a latch trip mechanism similar to the latch trip mechanism 173. (See Figure 14.)

The contacts 185 of the time limit relay switch apply a positive potential to a contactor 186 on the D. C. panel through wires 186ᵃ and 186ᵇ at the same time the contacts 184 are closed.

On the down stroke of the end shear blade 127, a limit switch 187 opens to keep the conveyor stopped. This switch is similar to the switch 179.

The operation of this end shear also closes by-pass limit switches 188 and 189 located in the same casing. (See Figure 13.) Referring to this figure, there is secured to the cutter bar which carries the blade 127, a cam member 190 which is adapted to engage a roller 191 on an arm 192 of the by-pass limit switches to close them on the down stroke of the end shear blade. Upon its down stroke, the end shear blade 127, acting in conjunction with the fixed blade 126, will cut off the leading or curl end of the pack while the conveyor is stopped.

The by-pass switch 188 applies a negative potential to the contactor 186 on the D. C.

panel through wires 188ª and 188ᵇ, which remains closed through its own contacts and by-passes the contacts 183 of the time relay, allowing the conveyor to be operated by the end shear through the limit switch 187.

The limit switch 189 closes the switch 193 on the A. C. panel, which holds itself closed through its own contacts and opens the following circuit to the end shear solenoid 194 through the time limit relay switch contacts 184. (See Figure 14.) The numeral 193ª designates a switch which is connected to one side of the A. C. line L¹ by wires 193ᵇ and 193ᶜ. The other side of the coil 193ª is connected to the A. C. line L² by a wire 193ᵈ.

One of the switch contacts 184 is connected to the A. C. line L¹ by a wire 184ª and the other contact 184 is connected to a contact 184ᵇ on the switch 193. One side of the coil of the switch 193ᵇ is connected to the A. C. line L² by a wire 184ᶜ. The other side of the coil of the switch 193 is connected to one side of the switch 189 by a wire 184ᵈ. The other side of the switch 189 is connected to the A. C. line L¹ by a wire 184ᵉ.

On the upstroke of the end shear blade 127, the safety switch 187 is closed, starting the conveyor, and as the pack strikes a slow down limit switch 195, a resistance 196 is dropped in series with the conveyor motor 54 and an armature shunt 197 applied to slow down the conveyor. The pack then strikes the switch 198, which stops the conveyor and releases the end shear.

The slow down limit switch 195, which is shown in detail in Figure 11, is carried by the adjustable stop bar 142 to which it is secured in the following manner. Referring to said figure, the numeral 199 designates a bracket member whose upper end is secured to the stop bar 142 and whose lower end projects below the latter. Secured to the lower end of this bracket member is an insulated frame 200 carrying a contact 201. The latter is adapted to be engaged by a contact arm 202 resiliently secured to the lower end of a bell crank lever 203 that is pivoted to an arm 204 of the bracket member. To the other end of the bell crank lever 203, which projects forwardly through a recess in the stop bar 142, there is secured a cam member 205 that is adapted to be engaged by the pack to close the switch 195 as shown by the full lines in Figure 11. (See Figures 4 and 11.)

To the adjustable bar 142, there is also secured the stop limit switch 198. In Figure 12, where this switch is shown in detail, the numeral 207 designates a bracket member to whose lower end an insulated frame 208 is attached. Secured in this frame are two oppositely disposed contacts 209 and 210 adapted to be engaged by two contact arms 211 and 212 respectively. These arms are secured to the lower end of a bell crank lever 213 pivoted to an arm 214 on the bracket member 207. Pivoted to the other end of the bell crank lever 213 is a stop block 215 adapted to be engaged by the leading end of the pack. When so engaged it withdraws the contact arm 212 from engagement with the contact 210 to break the circuit including the conveyor motor 54 to stop the latter. At the same time the contact arm 211 will be forced into engagement by the bell crank lever 214, with the contact 209 to close the circuit which includes the tripping mechanism for the end shear, thus causing the blade 127 of the latter to descend.

When the stop limit switch 198 breaks the circuit through the motor 54, a conventional magnetic brake 216 on the armature shaft 56 will stop the latter with sufficient drift to bring the pack up against the stop bar 142.

When the pack strikes the adjustable stop bar 142, it is in proper position to be cut by the end shear blade 127 which is now released by the limit switch 198 just described. A section of a width determined by the position of the adjustable stop bar 142, will then be cut from the pack by the descent of the end shear blade. After this occurs, the limit switches 195 and 198 will drop with the stop bar 142 below the line of the pack and reset, allowing the conveyor to start. The section of the pack now cut off, moves over the top end of the stop bar 142 which, being elevated, by the means hereinbefore described, kicks said severed portion up to clear the limit switches as they come in line for the next end of the pack.

The conveyor and end shear are now operated entirely by the limit switches 195 and 198 until the tail end of the pack allows the limit switches 183, 184 and 185 to reset, which will stop the end shear until the next pack arrives.

From the above description it will be observed that the caterpillar conveyors first receive the packs lengthwise, curl end first, and convey them in a flattened and rigid manner to the side cutting shears, when the conveyors automatically stop. In maintaining the moving packs in correct alinement with the cutting devices at all times, the endless hold-down conveyors are a most important feature of the machine, as well as for use generally in conveying sheet material from one point to another.

While gate shears are illustrated and described for trimming the side and end edges of the pack and for cutting it into multiples, rotary shears or any other type of shears may be employed in conjunction with the caterpillar conveyors for these purposes.

When both sides of the pack have been trimmed to the desired width, the conveyor again starts, carrying the pack to the end shear, which cuts off its curl or front end. After its leading or curl end is severed, the pack is carried by the endless conveyor of the end shear to the adjustable stop bar. Here a slow down switch and a stop limit switch slow down and stop the conveyor, causing the end cutting shear to cut off any sized multiples desired. This operation is repeated until the entire pack has passed through.

While the principal object of the invention is to provide for more accuracy and reliability in the quality of shearing, it is also notable that a very great saving in the cost of operation is accomplished.

Having described my invention, I claim:

1. In an automatic machine for shearing metal sheets, shearing devices for trimming the side edges from said sheets, and caterpillar hold-down conveyors in parallelism with said shearing devices to longitudinally engage the sheets along their side edges to maintain them in correct alinement with the shearing devices at all times.

2. In an automatic machine for shearing metal sheets, gate shearing devices for trimming the side edges from said sheets, and caterpillar hold-down conveyors in parallelism with said gate shearing devices to longitudinally engage the sheets along their sides edges to maintain them in correct alinement with the shearing devices at all times.

3. In a continuous, automatic machine for shearing metal sheets, shearing devices for trimming the side edges of said sheets, caterpillar conveyor chains, and co-acting pressure pads secured to said chains to engage bowed metal sheets along their side edges and to present them in a flattened state to the shearing devices.

4. In a continuous, automatic machine for shearing metal sheets, a pair of shearing devices for trimming the side edges of a metal sheet, an end shearing device for trimming the front end of the sheet, and co-acting caterpillar conveyors for engaging the metal sheets longitudinally along their side edges and for presenting the sheets first to the side shearing devices in correct alinement with them, and then to the end shearing device.

5. In a continuous, automatic machine for shearing metal sheets, a pair of shearing devices for trimming the side edges of a sheet, an end shearing device for trimming the leading end of a sheet, and co-acting caterpillar conveyors for engaging bowed or dished metal sheets longitudinally along their side edges to present them in a flattened state successively to the side shearing devices, and the end shearing device.

6. In a device for trimming the ends of metal sheets and for cutting them into multiples, an end shear, a motor for operating said shear, means for conveying a metal sheet to the end shear, and means movable upward into the path of said sheet for stopping the conveying means and for initiating the operation of the end shear by said motor for the purpose specified.

7. In a device for trimming the ends of metal sheets and for cutting them into multiples, an end shear, means for conveying a metal sheet to the end shear, a motor for operating said shear, and an adjustable device adapted to be moved upwardly for engagement by the metal sheet to stop the conveying means and to initiate the operation of the end shear by said motor for the purpose specified.

8. In a device for trimming the ends of metal sheets and for cutting them into multiples, a motor-operated end shear, motor-operated means for conveying a metal sheet to the end shear, an adjustable switch, and a stop member upwardly movable into the path of rearward movement of said sheet for engagement thereby to actuate the switch and through it to stop the conveying means and to initiate the operation of the end shear by said motor for the purpose specified.

9. In a device for trimming the ends of metal sheets and for cutting them into multiples, a motor-operated end shear, motor-operated means for conveying a metal sheet to the end shear, a fixed, horizontal guide, and an electric switch device supported by, and free to be moved along, said guide to an adjusted position for projection from below into the path of rearward movement of the metal sheet to stop the conveying means and to initiate the operation of the end shear by said motor for the purpose specified.

10. A device for cutting metal sheets into multiples, comprising endless means for conveying the sheets through it, an end shear, a pair of rearwardly projecting guide rods behind said shear, a vertically adjustable stop member free to move along said rods, screws for moving said stop member toward and away from the end shear, an electric switch carried by said stop member, and crank means for turning said screws to move the stop member, and through it, the switch to an adjusted position for engagement by the metal sheet to stop the conveying means and to initiate the operation of the end shear by said motor for the purpose specified.

11. A device for cutting a metal sheet into multiples, comprising an end shear, a guide projecting rearwardly from the end shear, a slide member formed with a slot free to move along said guide, means for moving the slide member to an adjusted position on the guide, a stop bar carried by the slide member and vertically movable through its slot into the path of rearward movement of the metal sheet to stop it in a proper position under the end shear to sever from it a multiple of the desired length, and common means for operating the end shear and the stop bar.

12. A device for cutting a metal sheet into multiples, comprising an end shear, a guide projecting rearwardly from the end shear, a slide member formed with a slot free to move along said guide, means for moving the slide member to an adjusted position on the guide, a stop bar carried by the slide member and vertically movable through said slot into the path of rearward movement of said sheet to stop it in a proper position under the end shear to sever from it a multiple of the desired length, a motor-operated eccentric shaft for reciprocating the end shear, means movable along said guide for raising and lowering the stop bar, a cam on the eccentric shaft, and link mechanism connected between the cam and the stop bar operating means, to raise and lower the stop bar when the end shear is actuated by the eccentric shaft.

13. In a continuous, automatic machine for shearing metal sheets, motor-operated side shearing devices, a motor-operated end shearing device, motor-operated endless means for conveying a sheet past the side shearing devices to the end shearing device, an electric switch actuated by the moving sheet for stopping the conveying means, for starting the operation of the side shearing devices and for restarting the conveying means, and a second electric switch actuated by the moving sheet to stop the conveying means and to start the operation of the end shearing device.

14. In a continuous, automatic machine for shearing metal sheets, motor-operated side shearing devices, a motor-operated end shearing device, motor-operated endless means for conveying a sheet past the side shearing devices to and through the end shearing device, an electric switch actuated by the moving sheet for stopping the conveying means, for starting the operation of the side shearing devices and for restarting the conveying means, a second electric switch actuated by the moving side-trimmed sheet for stopping the conveying means and for starting the operation of the end shear to trim the leading end of the side trimmed sheet, and an adjustable electric switch actuated by the side and end trimmed sheet to stop the conveying means and to start the operation of the end shear device to cut a multiple of the desired length from said sheet.

15. In a continuous, automatic machine for shearing metal sheets, motor-operated side shearing devices, a motor-operated end shearing device, motor-operated endless conveyors for conveying a metal sheet from the side shearing devices to the end shearing device, a switch actuated by the moving sheet, a time relay switch actuated by the first switch for stopping the conveying means and for starting the operation of the end shear to trim the leading end of the side-trimmed sheet, a third electric switch actuated by the end shearing device to keep the conveying means stopped during the end trimming operation of said end shearing device, a by-pass limit switch adapted to transfer control of the conveying means to the third electric switch to restart the conveying means and an adjustable electric switch actuated by the side and end trimmed sheet to stop the conveying means and to again start the operation of the end shearing device to cut a multiple of the desired dimensions from said sheet.

16. In a device for trimming the leading ends of metal sheets and for cutting them into multiples, a motor-operated end shear, motor-operated endless means for conveying a metal sheet past the end shear, a fixed rearwardly projecting guide, a slide movable along said guide, and a slow down electric switch and a stop limit electric switch carried by said slide for actuation by the metal sheet, traveling above, to stop the conveying means and to start the operation of the end shear to cut from said sheet a section of the desired length.

17. In an automatic machine for shearing metal sheets, shearing devices for trimming the side edges of said sheets, a pair of upper caterpillar conveyor chains and a pair of lower caterpillar conveyor chains which co-act with each other to receive a sheet between them for movement in correct alinement with the shearing devices, bottom rails upon which the inner runs of the lower chains travel and top rails along which the inner runs of the upper chains travel, fixed supports for the bottom rails, fixed grooved supports for the top rails, and springs within said grooved supports for applying a downward pressure to the top rails, for the purpose specified.

18. In a continuous automatic machine for shearing metal sheets, shearing devices for trimming the side edges of said sheets, upper and lower endless chains for receiving between them said sheets, rollers on said chains, floating rails along which the rollers on the inner runs of the chains travel, and resilient means for exerting a downward pressure upon the top rails to hold the chains down into firm engagement with the sheets.

In testimony whereof I have hereunto set my hand this 5th day of September, 1928.

FRANK H. STREINE.